United States Patent
Yang

(10) Patent No.: US 12,045,648 B2
(45) Date of Patent: Jul. 23, 2024

(54) OPERATING METHODS OF COMPUTING DEVICES AND COMPUTER-READABLE STORAGE MEDIA STORING INSTRUCTIONS

(71) Applicant: Samsung Electronics Co., Ltd., Suwon-si (KR)

(72) Inventor: Seung-Soo Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 17/371,485

(22) Filed: Jul. 9, 2021

(65) Prior Publication Data

US 2022/0179686 A1   Jun. 9, 2022

(30) Foreign Application Priority Data

Dec. 3, 2020   (KR) .......................... 10-2020-0167718

(51) Int. Cl.
  *G06F 9/48*   (2006.01)
  *G06N 3/04*   (2023.01)

(52) U.S. Cl.
  CPC ............. *G06F 9/4881* (2013.01); *G06N 3/04* (2013.01)

(58) Field of Classification Search
  CPC ........ G06F 9/4881; G06F 9/5038; G06F 9/52; G06N 3/04; G06N 3/063; G06N 20/00; G06N 3/08
  See application file for complete search history.

(56) References Cited

U.S. PATENT DOCUMENTS

| | | | |
|---|---|---|---|
| 8,856,936 B2 | 10/2014 | Datta Ray et al. | |
| 9,189,742 B2 | 11/2015 | London | |
| 9,875,445 B2 | 1/2018 | Amer et al. | |
| 10,402,828 B2 | 9/2019 | Sadaghiani et al. | |
| 10,521,902 B2 | 12/2019 | Avendi et al. | |
| 10,565,509 B2 | 2/2020 | London | |
| 2015/0178620 A1 | 6/2015 | Ascari et al. | |
| 2017/0071671 A1 | 3/2017 | Neumann et al. | |
| 2017/0213127 A1 | 7/2017 | Duncan | |
| 2017/0235848 A1 | 8/2017 | Van Dusen et al. | |
| 2017/0344882 A1* | 11/2017 | Ambrose | G06N 3/045 |
| 2018/0285011 A1* | 10/2018 | Ma | G06F 9/4881 |
| 2018/0357586 A1 | 12/2018 | Goergen et al. | |
| 2018/0365372 A1 | 12/2018 | Araya et al. | |
| 2019/0130248 A1 | 5/2019 | Zhong et al. | |
| 2019/0147346 A1 | 5/2019 | Reicher et al. | |
| 2019/0244108 A1 | 8/2019 | Meyerson et al. | |
| 2019/0244139 A1 | 8/2019 | Varadarajan et al. | |

(Continued)

FOREIGN PATENT DOCUMENTS

| | | |
|---|---|---|
| JP | 6644231 B1 | 1/2020 |
| KR | 20110037184 A | 4/2011 |
| KR | 20200086546 A | 7/2020 |

*Primary Examiner* — Brian W Wathen
(74) *Attorney, Agent, or Firm* — Myers Bigel, P.A.

(57) ABSTRACT

Operating methods of computing devices which include a central processing unit and a plurality of sub-processors configured to execute a machine learning model, and computer-readable media storing instructions. For example, an operating method may include dynamically assigning one of a blocking mode or a non-blocking mode to each task of a plurality of tasks of the machine learning model to establish a policy, and executing the machine learning model and the tasks thereof based on the policy.

19 Claims, 11 Drawing Sheets

(56) References Cited

U.S. PATENT DOCUMENTS

| | | |
|---|---|---|
| 2019/0276041 A1 | 9/2019 | Choi et al. |
| 2019/0294792 A1 | 9/2019 | Singh et al. |
| 2019/0370086 A1 | 12/2019 | Heilper et al. |
| 2019/0370630 A1 | 12/2019 | Yang |
| 2020/0065671 A1 | 2/2020 | Sahni et al. |
| 2020/0090056 A1 | 3/2020 | Singhal et al. |
| 2020/0118266 A1 | 4/2020 | Avendi et al. |
| 2020/0151579 A1 | 5/2020 | Yang |
| 2020/0175361 A1* | 6/2020 | Che .................. G06N 5/022 |
| 2020/0342258 A1 | 10/2020 | Uno et al. |
| 2021/0080982 A1* | 3/2021 | Mehta ............ G06F 11/3062 |

* cited by examiner

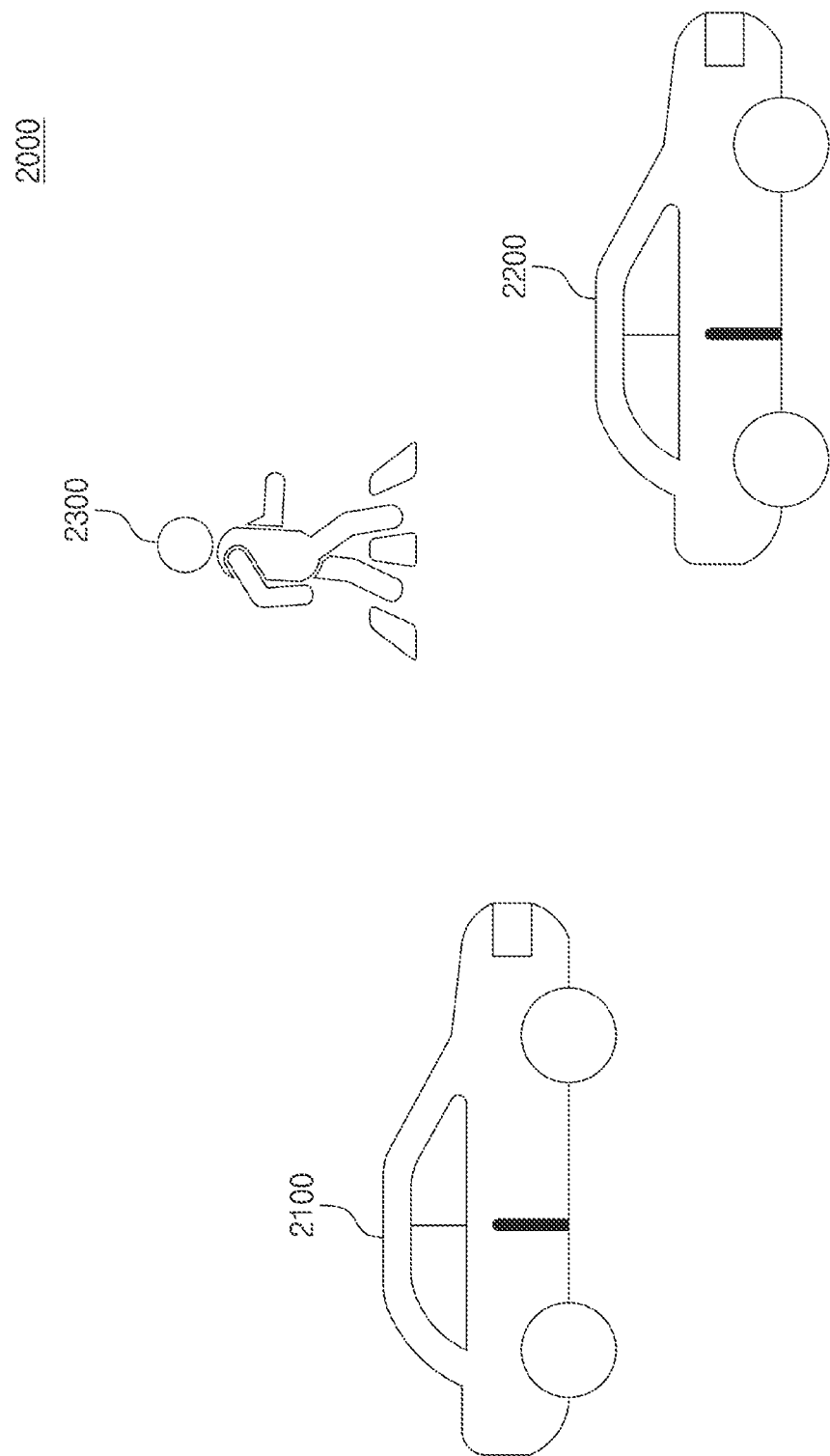

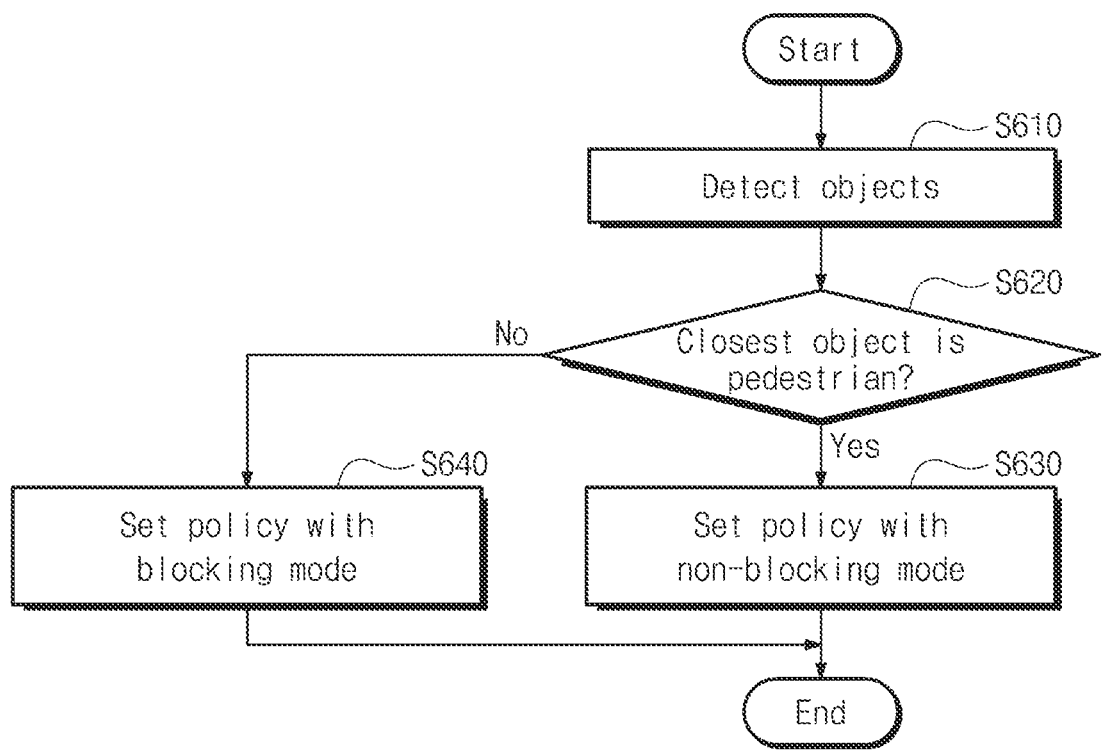

OPERATING METHODS OF COMPUTING DEVICES AND COMPUTER-READABLE STORAGE MEDIA STORING INSTRUCTIONS

CROSS-REFERENCE TO RELATED APPLICATION(S)

This application claims priority under 35 U.S.C. § 119 to Korean Patent Application No. 10-2020-017718 filed on Dec. 3, 2020, in the Korean Intellectual Property Office, the contents of which are incorporated by reference herein in their entireties.

TECHNICAL FIELD

Aspects of the present disclosure relate to electronic devices and computing devices, and more particularly, relate to operating methods of computing devices configured to execute machine learning models, and relate to computer-readable storage media storing instructions.

BACKGROUND

Machine learning algorithms may include various algorithms such as neural networks, decision trees, and a support vector machines (SVM). A machine learning model may be a result learned based on machine learning, and may include algorithms that draw or reach a result by performing a work, such as an inference, a classification, or a recognition on an input. The input may be an image data or an audio sample, as examples. Examples of performed work include recognizing an object in an image, classifying a kind of an object, or recognizing a voice.

Machine learning models may be implemented to perform a work in real time. For machine learning models to perform work in real time, it may be necessary to improve speeds at which machine learning models are executed.

SUMMARY

Embodiments of the present disclosure provide operating methods of computing devices executing machine learning models at improved speeds, and provide computer-readable storage media storing instructions.

According to some embodiments, an operating method of a computing device is provided. The computing device may include a central processing unit and a plurality of sub-processors configured to execute a machine learning model. The operating method may include dynamically assigning one of a blocking mode or a non-blocking mode to each task of a plurality of tasks of the machine learning model to establish a policy, and executing the machine learning model and the tasks thereof based on the policy.

According to some embodiments, an operating method of a computing device is provided. The computing device may include a central processing unit and a plurality of sub-processors configured to execute a machine learning model. The operating method may include dynamically assigning each task of a plurality of tasks of the machine learning model to one of the central processing unit or one of the plurality of sub-processors and dynamically assigning one of a blocking mode or a non-blocking mode to each task of the plurality of tasks of the machine learning model to establish a policy, and executing the machine learning model and the tasks thereof based on the policy.

According to some embodiments, a non-transitory computer-readable storage medium storing instructions is provided that, when executed by a central processing unit and a plurality of sub-processors, causes operations of: dynamically assigning each task of a plurality of tasks of a machine learning model to one of the central processing unit or one of the plurality of sub-processors and dynamically assigning one of a blocking mode or a non-blocking mode to each task of the plurality of tasks of the machine learning model to establish a policy, and executing the machine learning model and the tasks thereof based on the policy.

BRIEF DESCRIPTION OF THE FIGURES

The above and other objects and features of the present disclosure will become apparent by describing in detail embodiments thereof with reference to the accompanying drawings.

FIG. 11 illustrates an example of an autonomous driving system.

FIG. 12 illustrates an example where a policy of a machine learning model is changed at an autonomous driving vehicle of an autonomous driving system of FIG. 11.

DETAILED DESCRIPTION

Below, some embodiments of the present disclosure are described in detail and to such an extent so as to permit one skilled in the art to implement the inventive concepts provided by the present disclosure.

Figure 1:
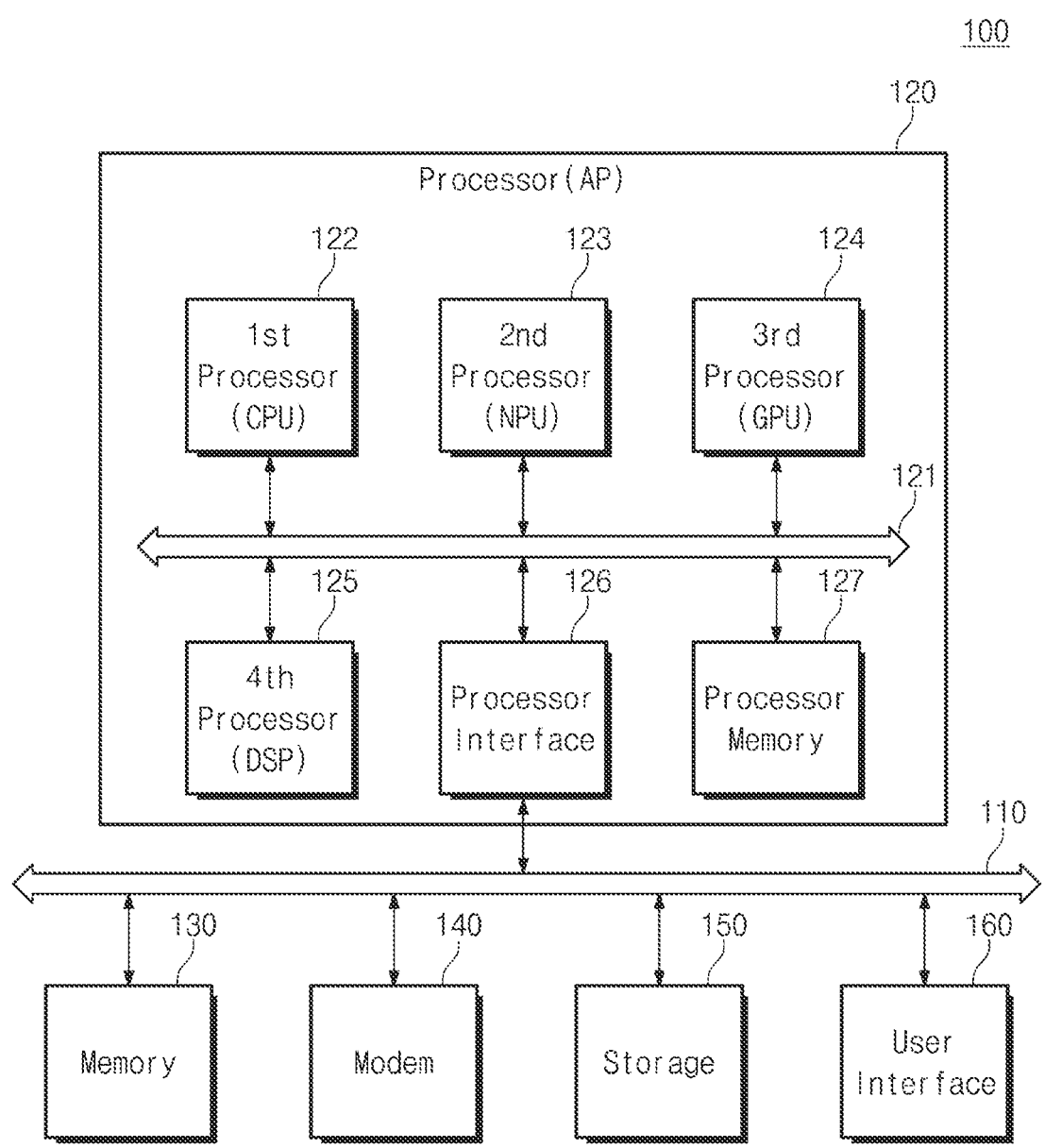
FIG. 1 illustrates a computing device according to some embodiments of the present disclosure.

FIG. 1 illustrates a computing device 100 according to some embodiments of the present disclosure. Referring to FIG. 1, the computing device 100 includes a bus 110, a processor 120, a memory 130, a modem 140, storage 150, and a user interface 160.

The bus 110 may provide channels between components of the computing device 100 to allow the components of the computing device 100 to communicate with each other. For example, the bus 110 may provide the channels between the components of the computing device 100 based on various known standards, such as PCIe (Peripheral Component Interconnect express) and SCSI (Small Computer System Interface), or based on a standard defined by a manufacturer of the computing device 100.

In some embodiments, the components of the computing device 100 other than the processor 120 and the bus 110 (e.g., the memory 130, modem 140, storage 150, and user interface 160) may be configured to communicate with the processor 120 based on various different standards. The bus 110 may include drivers the supporting the conversion of communications between communication standards of the other components 130, 140, 150, 160 of the computing device 100 and a communication standard of the processor 120.

The processor 120 may control the computing device 100 and operations thereof. The processor 120 may drive an operating system for controlling the computing device 100 and operations thereof. The processor 120 may execute various applications, based on the operating system. For example, the processor 120 may be implemented with an application processor (AP).

The processor 120 may include a processor bus 121, a first processor 122, a second processor 123, a third processor 124, a fourth processor 125, a processor interface 126, and a processor memory 127. The processor bus 121 may provide channels between components of the processor 120 to allow the components of the processor 120 to communicate with each other. For example, the processor bus 121 may provide the channels between the components of the processor 120 based on various known standards, such as AMBA (Advanced Microcontroller Bus Architecture), or based on a standard defined by a manufacturer of the processor 120.

The first processor 122 may be a main processor of the processor 120. For example, the first processor 122 may be implemented with a central processing unit (CPU). The second processor 123, the third processor 124, and the fourth processor 125 may be sub-processors of the processor 120.

For example, the second processor 123 may be implemented with a neural processing unit (NPU). The third processor 124 may be implemented with a graphic processing unit (GPU). The fourth processor 125 may be implemented as a digital signal processor (DSP). One example embodiment of a number of sub-processors of the processor 120 with different kinds of sub-processors is presented in FIG. 1, but the number of sub-processors of the processor 120 and the kinds of the sub-processors of the processor 120 are not limited thereto. For example, in some embodiments there may be multiple of one kind of sub-processor (e.g., multiple NPUs), in some embodiments there may be none of one kind of sub-processor (e.g., no GPUs), and so on.

The processor interface 126 may provide an interface between the components of the processor 120 and the bus 110 to allow the components of the processor 120 to communicate with any other components 130, 140, 150, 160, of the computing device 100 through the bus 110.

The processor memory 127 may be used to store data or codes of instructions that are used by the first processor 122, the second processor 123, the third processor 124, and/or the fourth processor 125. For example, the processor memory 127 may be implemented with a cache memory or a working memory. The processor memory 127 may include a static random access memory (SRAM).

The memory 130 may be used to store data or codes of instructions of an operating system and/or applications executable by the processor 120. The memory 130 may be a main memory of the computing device 100. For example, the memory 130 may be implemented with a dynamic random access memory (DRAM) or a storage class memory (SCM).

The memory 130 may configured to communicate with the processor 120 based on the DRAM standard. In some embodiments, the memory 130 may be implemented to be directly coupled to the processor 120, and may be implemented to provide a storage space to any other components 140, 150, 160 of the computing device 100 through the processor 120. The memory 130 may be implemented together with a memory controller configured to provide access to the memory 130. In some embodiments, the memory controller may be integrated within the processor 120.

The modem 140 may provide a channel for wired or wireless communication with an external device. In some embodiments, the modem 140 may provide a channel for wired or wireless communication with an external device based on various wireless communication standards, such as Wi-Fi, LTE (Long Term Evolution), 5G (5 Generation), Bluetooth, and NFC (Near Field Communication), and/or based on various wired communication standards such as USB (Universal Serial Bus), cable, and Fiber channel. In some embodiments, the modem 140 may be integrated with the processor 120.

The storage 150 may be implemented to store the data and the codes of the instructions of the operating system and/or the applications such that the data and codes may be retained even when a power is interrupted or removed. The storage 150 may be implemented with various nonvolatile storage devices, such as a solid state drive (SSD), an optical disk drive (ODD), and/or a hard disk drive (HDD).

The storage 150 may communicate with the bus 110 (and accordingly, components of the computing device 100) based on various standards, such as NVMe (NonVolatile Memory express), SAS (Serial Attached SCSI), and SATA (Serial Advanced Technology Attachment). Additionally, or alternatively, the storage 150 may be implemented with a removable memory that is based on a standard supporting detachment and attachment, such as USB.

The user interface 160 may receive information from a user and may provide information to the user. For example, the user interface 160 may include user input devices, which are implemented to receive information from the user, such as a keyboard, a mouse, a microphone, a touch pad, a touch panel, a camera, and a sensor. Additionally, or alternatively, the user interface 160 may include user output devices, which are implemented to provide information to the user, such as a monitor, a speaker, a beam projector, and a printer.

The processor 120 may drive a machine learning model manager as one of the applications. Data and codes of instructions of the machine learning model manager may be stored in the storage 150, and may be loaded onto the memory 130 so as to be used by the processor 120. The machine learning model manager may be implemented to dynamically execute various machine learning models.

A machine learning model may be a result learned based on machine learning, and may include algorithms that draw or reach a result by performing a work, such as an inference, a classification, or a recognition on an input. The input may be image data or an audio sample, as examples. Examples of performed work include recognizing an object in an image, classifying a kind of an object, or recognizing a voice. Data and codes of instructions of the machine learning models may be stored in the storage 150, and may be loaded onto the memory 130 so as to be executed by the machine learning model manager.

The machine learning model may include a plurality of tasks. Tasks may be units that are independently executable by different processors, for example, different ones of the first to fourth processors 122 to 125. To accelerate an execution speed of the machine learning model, the machine learning model manager may dynamically assign tasks to the first to fourth processors 122 to 125 and may dynamically assign modes of the tasks to perform a work.

In some embodiments, the machine learning model manager may be stored by a non-transitory computer-readable storage medium such as a removable memory or in the storage 150 through the modem 140. The storage 150 may be implemented with a non-transitory computer-readable storage medium.

The description is given with reference to FIG. 1 as the second processor 123, the third processor 124, and the fourth processor 125 are integrated in the processor 120 together with the first processor 122, with the understanding that the present disclosure is not limited thereto. For example, at least one or all of the second processor 123, the third processor 124, and the fourth processor 125 may be provided outside the processor 120 and may communicate with the processor 120 through the bus 110.

Figure 2:
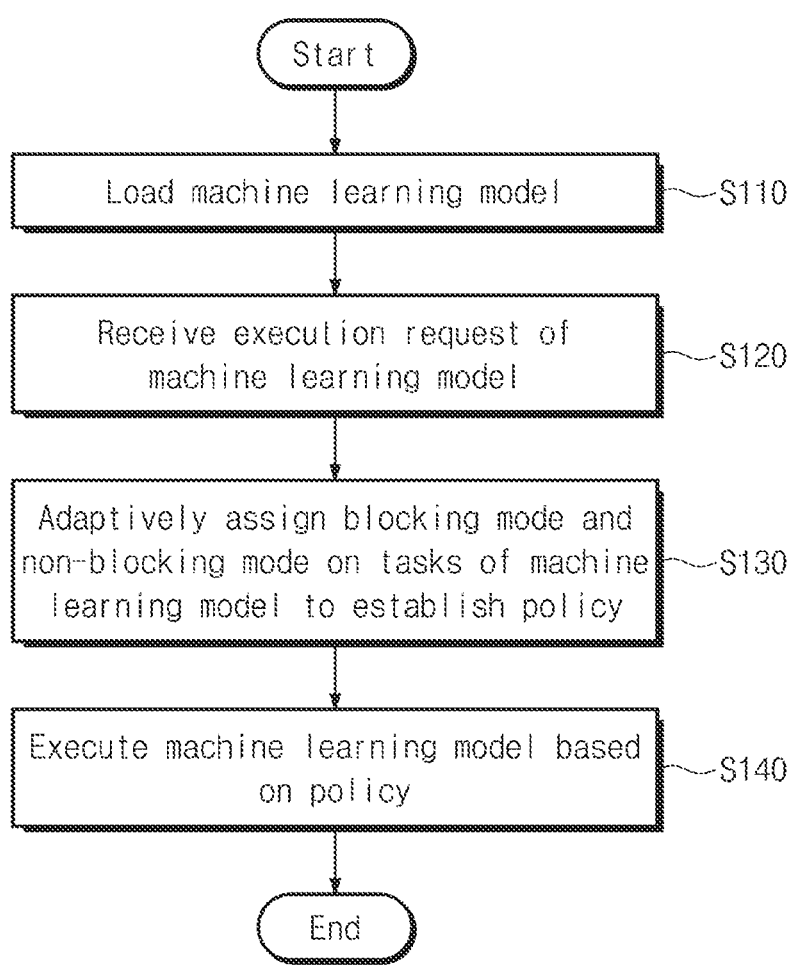
FIG. 2 illustrates an operating method of a computing device according to some embodiments of the present disclosure.

FIG. 2 illustrates an operating method of the computing device 100 according to some embodiments of the present disclosure. Referring to FIGS. 1 and 2, in operation S110, a machine learning model manager driven by the processor 120 may load a machine learning model from the storage 150. For example, the machine learning model manager may load data and codes of instructions of the machine learning model and may execute the instructions of the machine learning model.

In operation S120, the computing device 100 may receive an execution request that requests execution of the machine learning model. For example, the machine learning model manager may receive the execution request through the modem 140 or through the user interface 160. Alternatively, the machine learning model manager may receive the execution request from an application or applications, which are driven by the processor 120, through an application program interface (API).

In operation S130, the machine learning model manager of the computing device 100 may dynamically assign a blocking mode or a non-blocking mode to tasks of the machine learning model to establish a policy of the machine learning model. The policy may indicate a method (or a mode) in which the machine learning model manager performs each of the tasks of the machine learning model. For example, the machine learning model manager may allow at least one of the tasks of the machine learning model to transition between the blocking mode and the non-blocking mode, depending on a given condition. Examples of the given condition will be described in more detail with reference to FIG. 6.

In operation S140, the machine learning model manager of the computing device 100 may execute the machine learning model based on the policy set in operation S130 in order to perform the work. The work may indicate a process of drawing or reaching an output by performing the tasks on input data provided to the machine learning model.

Figure 3:
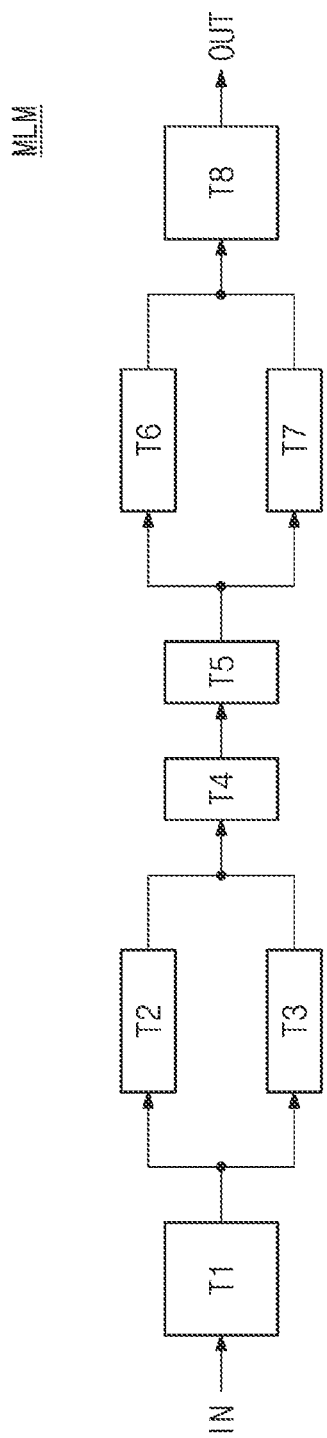
FIG. 3 illustrates an example of tasks of a machine learning model.

FIG. 3 illustrates an example of tasks of a machine learning model MLM. Referring to FIG. 3, the tasks of the machine learning model MLM may be hierarchically implemented. The machine learning model MLM may include first to eighth tasks T1 to T8. The first task T1 may be performed on input data IN. The second task T2 and the third task T3 may be performed on result data of the first task T1.

The fourth task T4 may be performed on result data of the second task T2 and result data of the third task T3. The fifth task T5 may be performed on result data of the fourth task T4.

The sixth task T6 may be performed on result data of the fifth task T5. The seventh task T7 may also be performed on the result data of the fifth task T5. The eighth task T8 may be performed on result data of the sixth task T6 and result data of the seventh task T7. Result data of the eighth task T8 may be output as output data OUT and may be a result of the machine learning model MLM. The first to eighth tasks T1 to T8 may be performed by different processors independently of each other.

Figure 4:
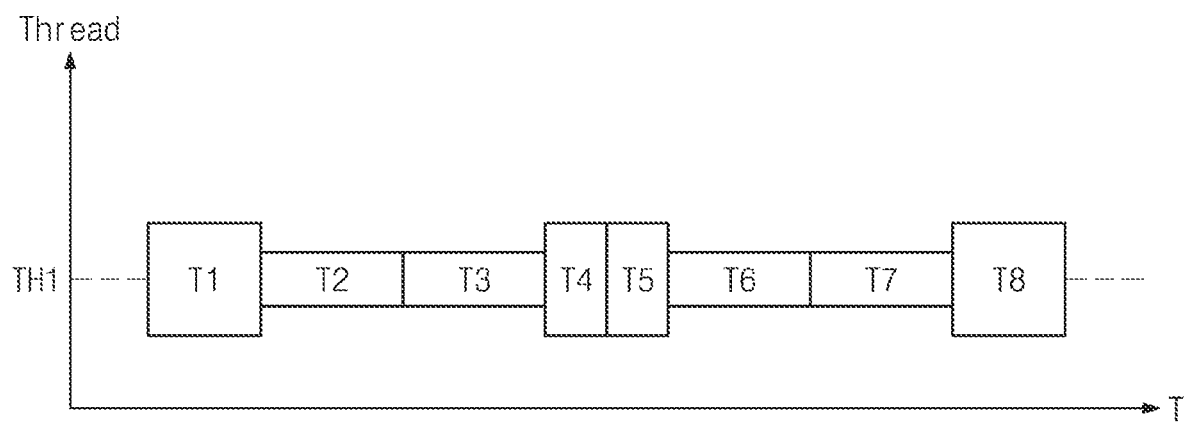
FIG. 4 illustrates an example where tasks of a machine learning model are performed in a blocking mode.

FIG. 4 illustrates an example where the tasks T1-T8 of the machine learning model MLM shown in FIG. 3 are performed in a blocking mode. In FIG. 4, the horizontal axis represents a time "T", and the vertical axis represents a thread of the processor 120. Referring to FIGS. 1 and 4, in the blocking mode, the first to eighth tasks T1 to T8 may be sequentially performed by one first thread TH1.

For example, the second task T2 and the third task T3 are performed in common on result data of the first task T1. While the first thread TH1 of the processor 120 performs the second task T2 on the result data of the first task T1, the first thread TH1 may block the execution of the third task T3. When the second task T2 is completed, the first thread TH1 may perform the third task T3 on result data of the first task T1.

Likewise, the sixth task T6 and the seventh task T7 are performed in common on result data of the fifth task T5. While the first thread TH1 of the processor 120 performs the sixth task T6 on the result data of the fifth task T5, the first thread TH1 may block the execution of the seventh task T7. When the sixth task T6 is completed, the first thread TH1 may perform the seventh task T7 on result data of the first task T5.

Figure 5:
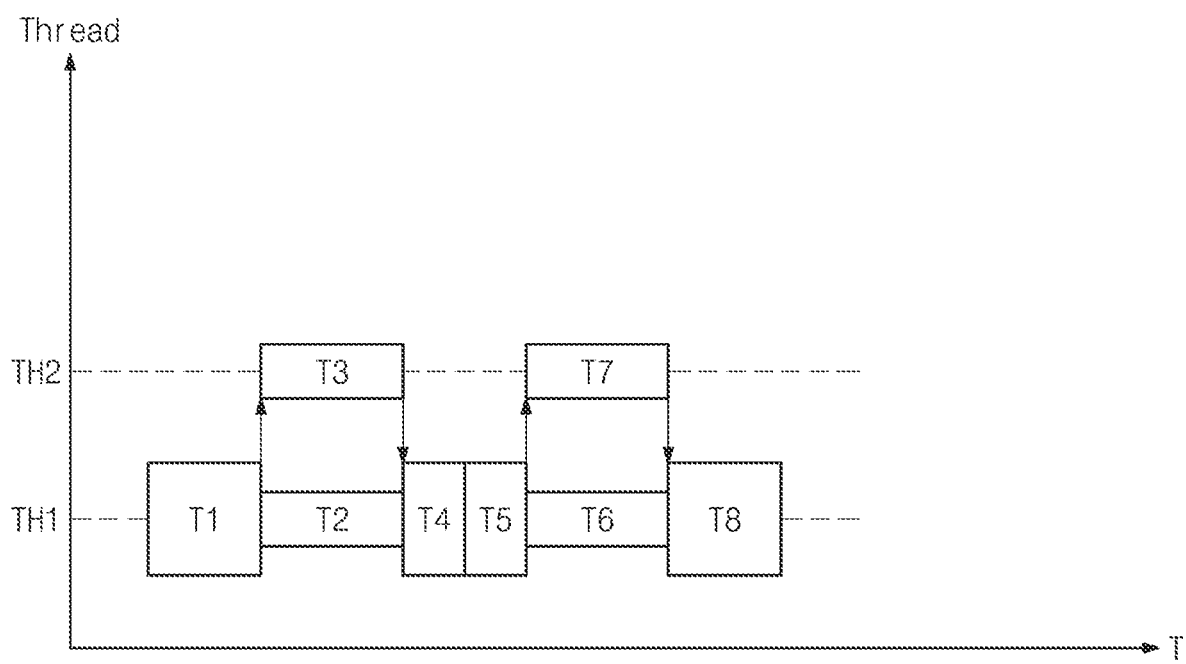
FIG. 5 illustrates an example where tasks of a machine learning model are performed in a non-blocking mode.

FIG. 5 illustrates an example where the tasks T1-T8 of the machine learning model MLM shown in FIG. 3 are performed in a non-blocking mode. In FIG. 5, the horizontal axis again represents a time "T", and the vertical axis represents threads of the processor 120. Referring to FIGS. 1 and 5, in the non-blocking mode, the first to eighth tasks T1 to T8 may be sequentially performed by the first thread TH1 and a second thread TH2.

The first thread TH1 and the second thread TH2 may respectively perform tasks which are capable of being performed in parallel. Referring again to the hierarchical structure illustrated in FIG. 3, the second task T2 and the third task T3 may be tasks capable of being performed in parallel, and the sixth task T6 and the seventh task T7 may be tasks capable of being performed in parallel. The second task T2 and the third task T3 may be capable of being performed in parallel because neither of the tasks T2 and T3 depends on a result of the other of the tasks T2 and T3 for execution. Similarly, the sixth task T6 and the seventh task T7 may be capable of being performed in parallel because neither of the tasks T6 and T7 depends on a result of the other of the tasks T6 and T7 for execution. The first thread TH1 may sequentially perform the first task T1, the second task T2, the fourth task T4, the fifth task T5, the sixth task T6, and the eighth task T8.

The second task T2 and the third task T3 are performed in common on result data of the first task T1. While the first thread TH1 of the processor 120 performs the second task T2 on the result data of the first task T1, the result data of the first task T1 may be transferred to the second thread TH2.

The second thread TH2 may perform the third task T3 on the result data of the first task T1 and may transfer result data of the third task T3 to the first thread TH1. The first thread TH1 may perform the fourth task T4 on result data of the second task T2, and the result data of the third task T3 transferred from the second thread TH2.

Likewise, the sixth task T6 and the seventh task T7 are performed in common on result data of the fifth task T5. While the first thread TH1 of the processor 120 performs the sixth task T6 on the result data of the fifth task T5, the first thread TH1 may transfer the result data of the fifth task T5 to the second thread TH2.

The second thread TH2 may perform the seventh task T7 on the result data of the fifth task T5 and may transfer result data of the seventh task T7 to the first thread TH1. The first thread TH1 may perform the eighth task T8 on result data of the sixth task T6, and the result data of the seventh task T7 transferred from the second thread TH2.

Comparing FIG. 4 and FIG. 5, in general, an execution speed of the machine learning model MLM operating in the non-blocking mode may be regarded as being faster than an execution speed of the machine learning model MLM operating in the blocking mode. However, the communication between the first thread TH1 and the second thread TH2 may require a time, which may be up to several milliseconds (ms) or longer. A communication speed between the first thread TH1 and the second thread TH2 and a task execution speed of each of the first thread TH1 and the second thread TH2 may become slower depending on various factors such as a characteristic and a work load of the processor 120.

Accordingly, when the machine learning model MLM is actually executed at the computing device 100, it may be variable as to which of the non-blocking mode and the blocking mode provides a faster execution speed. The machine learning model manager that is driven at the processor 120 of the computing device 100 according to some embodiments of the present disclosure may improve an actual execution speed of the machine learning model MLM by setting each of tasks of the machine learning model MLM to the non-blocking mode or the blocking mode.

Figure 6:
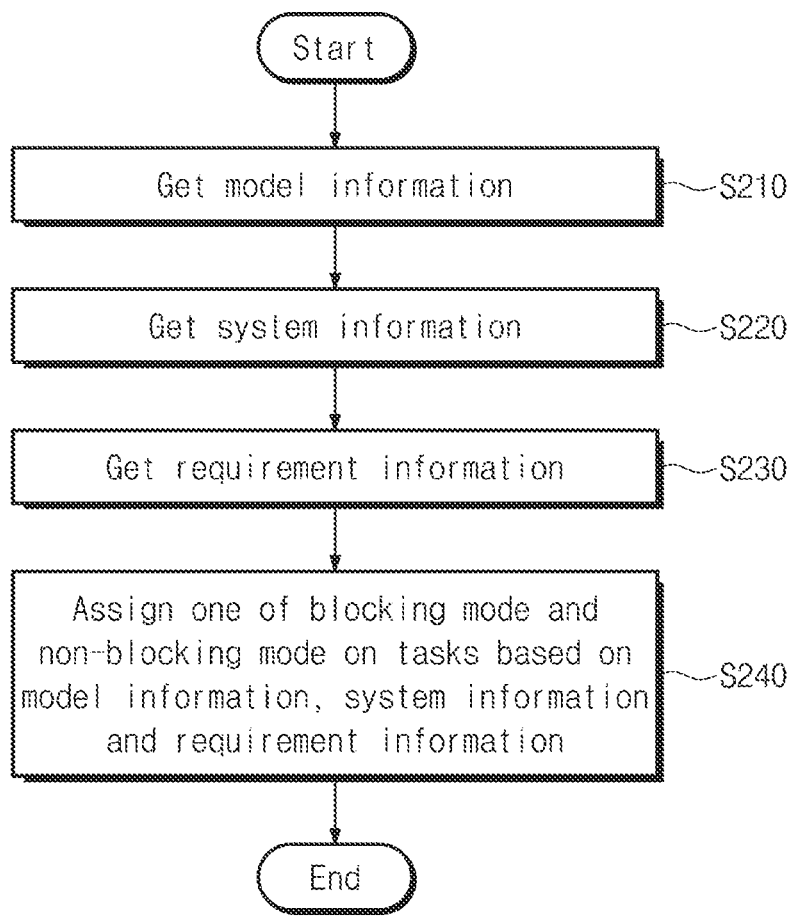
FIG. 6 illustrates an example where a machine learning model manager driven by a processor of a computing device establishes a policy.

FIG. 6 illustrates an example where the machine learning model manager driven by the processor 120 of the computing device 100 establishes a policy. Referring to FIGS. 1 and 6, in operation S210, the machine learning model manager may get model information. The model information may include information about a machine learning model that is loaded by the machine learning model manager. For example, the model information may include factors that affect an execution time (or speed) of a work or an execution time (or speed) of each of tasks from among information associated with the machine learning model.

For example, the model information may include information of a type of the machine learning model. The information of the type of the machine learning model may include information indicating whether a machine learning model is a convolutional neural network (CNN), a recursive neural network (RNN), or a transformer, as examples. Additionally, or alternatively, the information of the type of the machine learning model may include information indicating whether the machine learning model MLM is a neural network, a decision tree, or a support vector machine (SVM), as examples.

Model information may include information about a work to be performed by the machine learning model. For example, information of the work of the machine learning model may include information about whether the work to be performed by the machine learning model is classification, object recognition, or automatic speech recognition (ASR), as examples.

The model information may include a name of the machine learning model or a file name of the machine learning model. For example, the machine learning model manager may include (or store) information of a statistical execution time (or speed) of each of the works or the tasks of the machine learning models for each name of the machine learning model or for each file name of the machine learning model. The machine learning model manager may make reference to the statistical execution time (or speed) based on the name of the machine learning model or the file name of the machine learning model.

The model information may include a hierarchical structure of the tasks of the machine learning model. For example, the machine learning model manager may get information of the hierarchical structure, that is, the number of tasks to be performed in serial (or sequentially), the number of tasks capable of being performed in parallel (or simultaneously), locations on the hierarchical structure at which the number of tasks capable of being performed in parallel (or simultaneously) are respectively placed, or the like.

The model information may include information of hardware. For example, the model information may include information about at least one associated with the machine learning model from among the first to fourth processors 122 to 125. For example, the model information may include information about a kind of a processor preferred or required by each of the tasks, for example, information of at least one processor preferred or required from among a CPU, an NPU, a GPU, and a DSP, as examples. The information of the preferred or required processor may be determined statistically based on the tasks and an execution history of the first to fourth processors 122 to 125 or may be detected based on distinct characteristics of the tasks and distinct characteristics of the first to fourth processors 122 to 125.

The model information may include information (e.g., information of a size or a structure) of a control program (e.g., an NPU control program (NCP)) executable at each of the first to fourth processors 122 to 125.

In some embodiments, at least a portion or all of the model information collected in operation S210 may be set in advance by the machine learning model manager before the machine learning model is executed by the machine learning model manager. Additionally, or alternatively, at least a portion or all of the model information collected in operation S210 may be obtained from the machine learning model when the machine learning model is executed by the machine learning model manager.

In operation S220, the machine learning model manager may get system information. The system information may include information about a system where the machine learning model manager is loaded and where the machine learning model is loaded, for example, information about the computing device 100. In some embodiments, the system information may include hardware factors affecting a time (or speed) during (or at) which the machine learning model executes a work or a time (or speed) during (or at) which each of tasks is executed, with regard to executing the machine learning model manager and the machine learning model.

The system information may include information of input data of the machine learning model. The system information may include at least one of a performance, a current available resource, and/or a current work load of each of the first to fourth processors 122 to 125. Also, the system information may include information (e.g., the number and kinds) of tasks being processed by each of the first to fourth processors 122 to 125 (or process-requested tasks being pending).

The system information may include information of a capability, capacity, and/or a limitation of each of the first to fourth processors 122 to 125. For example, the capacity information may include a tera operations per second (TOPS) that each of the first to fourth processors 122 to 125 supports, a TOPS per power, and operations that each of the first to fourth processors 122 to 125 supports.

The limitation information may include information of the number of digits that are limited while each of the first to fourth processors 122 to 125 performs an operation. For example, a specific processor may support only operations up to three digits in addition. Another specific processor may support only operations of floating-point numbers.

The system information may include history information of each of the first to fourth processors 122 to 125 operating in association with the machine learning model. For example, the history information may include information of an execution time during which each of the first to fourth processors 122 to 125 performs various tasks in the blocking mode or the non-blocking mode. For example, based on the history information, the machine learning model manager may determine whether a speed in the blocking mode is actually faster or whether a speed in the non-blocking mode is actually faster when a specific processor performs a specific task.

The system information may include information of an operating mode of each of the first to fourth processors 122 to 125. For example, the information of the operating mode may include information of a power mode of each of the first to fourth processors 122 to 125. The information of the power mode may indicate one of a normal mode and two or more stepwise power saving modes.

The information of the operating mode may include heat management information of each of the first to fourth processors 122 to 125. The heat management information may include information indicating whether a performance of each of the first to fourth processors 122 to 125 is limited for heat management.

The information of the operating mode may include information about a DVFS (Dynamic Voltage and Frequency Scaling) level of each of the first to fourth processors 122 to 125. The DVFS may enable each of the first to fourth processors 122 to 125 to operate with a low power by dynamically adjusting a voltage level and a frequency depending on a work load of each of the first to fourth processors 122 to 125.

In some embodiments, at least a portion or all of the system information collected in operation S220 may be in advance obtained or managed by the machine learning model manager before the machine learning model is executed by the machine learning model manager. Additionally, or alternatively, at least a portion or all of the model information collected in operation S220 may be obtained or managed in real time when the machine learning model is executed by the machine learning model manager.

In operation S230, the machine learning model manager may get requirement information. The requirement information may include information indicating whether an application requires an execution of tasks in a blocking manner or a non-blocking manner through the application program interface (API).

Also, the requirement information may include a result of at least one different task preceding at least one task from among the tasks. For example, the requirement information may include information indicating whether a result of a preceding task requires an execution of a blocking manner or a non-blocking manner of a following task, in the process of performing tasks.

In operation S240, the machine learning model manager may dynamically assign one of the blocking mode and the non-blocking mode to each of tasks, based on the model information, the system information, and the requirement information.

For example, the machine learning model manager may assign the blocking mode and the non-blocking mode to each of tasks when the tasks are loaded. When executing a specific task, the machine learning model manager may set (or update) a corresponding model to the blocking mode or the non-blocking mode, based on at least one of the model information, the system information, and the requirement information.

Figure 7:
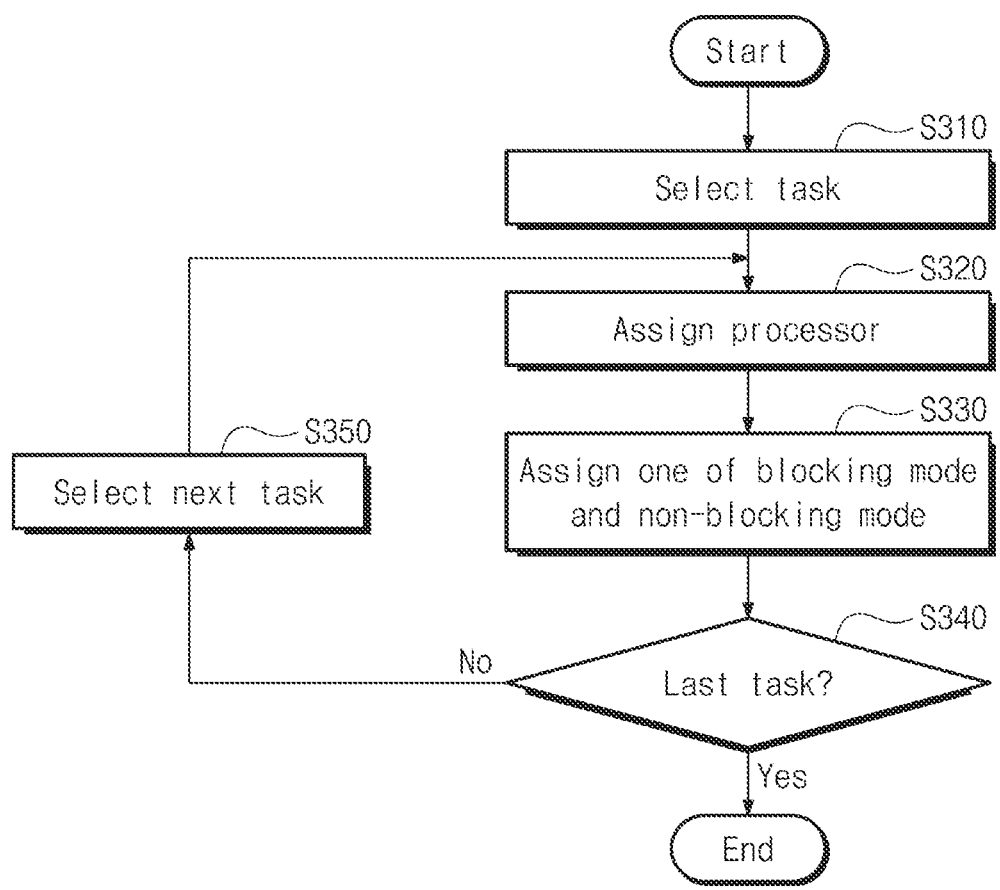
FIG. 7 illustrates an example where a machine learning model manager executed by a processor assigns one of a blocking mode and a non-blocking mode to a task.

FIG. 7 illustrates an example where the machine learning model manager executed by the processor 120 assigns one of the blocking mode and the non-blocking mode to a task. Referring to FIGS. 1 and 7, in operation S310, the machine learning model manager may select one of tasks of a machine learning model.

In operation S320, the machine learning model manager may assign one of the first to fourth processors 122 to 125 to the selected task. For example, the machine learning model manager may assign a processor to the selected task, based on information of a processor(s) that an execution of the selected task prefers or requires, and an available resource or a work load of the corresponding processor(s).

In operation S330, the machine learning model manager may assign one of the blocking mode and the non-blocking mode to the selected task. For example, the machine learning model manager may assign the blocking mode or the non-blocking mode to the selected task, based on a performance, a load, or distinct characteristics when the selected task is executed at the assigned processor and based on the model information, the system information, and the requirement information.

In operation S340, the machine learning model manager may determine whether the selected task is the last task. When the selected task is not the last task ("No" branch from operation S340), in operation S350, the machine learning model manager may select a next task and may return to operation S320. When the selected task is the last task ("Yes" branch from operation S340), the machine learning model manager may terminate the assignment associated with the tasks.

Figure 8:
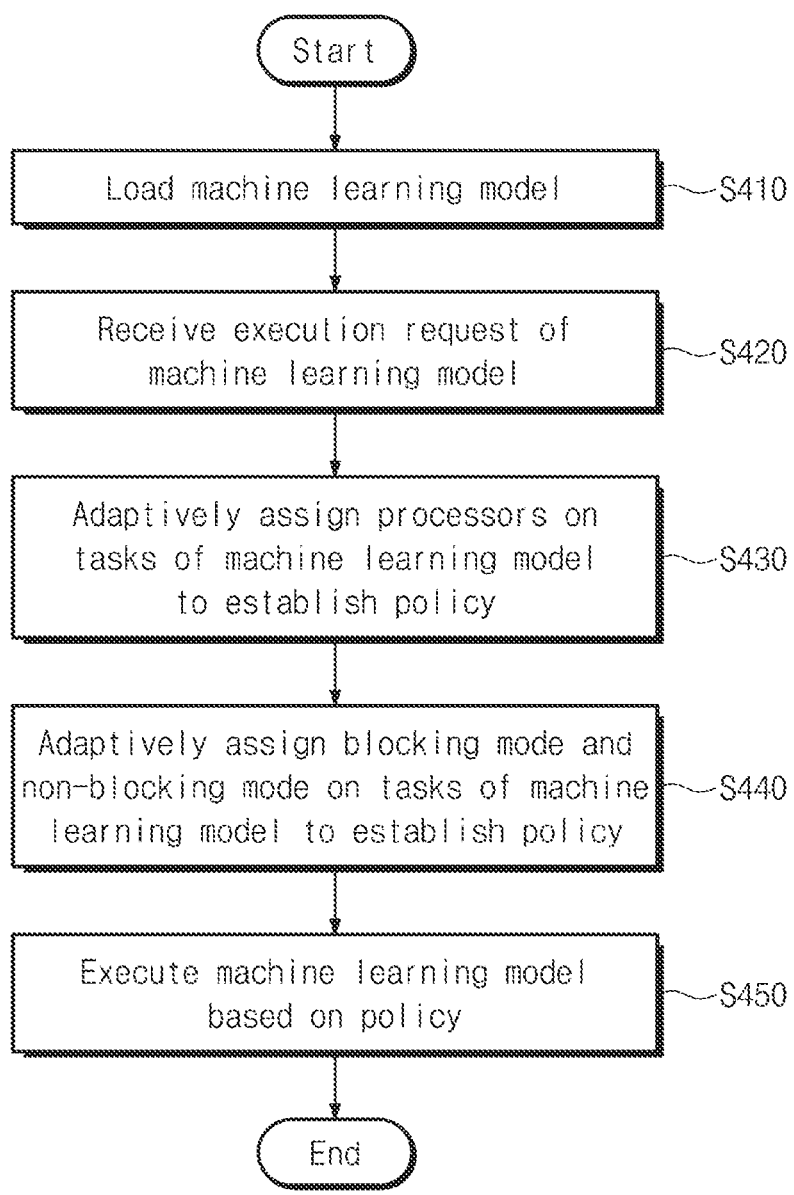
FIG. 8 illustrates an example where a machine learning model manager executed by a processor dynamically assigns a processor and a mode to each task.

FIG. 8 illustrates an example where the machine learning model manager executed by the processor 120 dynamically assigns a processor and a mode to each task. Referring to FIGS. 1 and 8, in operation S410, the machine learning model manager driven by the processor 120 may load a machine learning model from the storage 150. For example, the machine learning model manager may load data and codes of instructions of the machine learning model and may execute the instructions of the machine learning model.

In operation S420, the computing device 100 may receive an execution request for execution of the machine learning model. For example, the machine learning model manager may receive the execution request through the modem 140 or through the user interface 160. Alternatively, the machine learning model manager may receive the execution request from applications, which are driven by the processor 120, through an application program interface (API).

In operation S430, as a portion of a process of establishing a policy of the machine learning model, the machine learning model manager of the computing device 100 may dynamically assign the first to fourth processors 122 to 125 to tasks of the machine learning model. The policy may indicate a method (or a mode) in which the machine learning model manager performs each of the tasks of the machine learning model.

For example, the machine learning model manager may assign one of the first to fourth processors 122 to 125 to each of the tasks, based on the model information, the system information, or the requirement information including information of a processor(s) that an execution of the tasks prefers or requires, an available resource or a work load of the first to fourth processors 122 to 125, a history when the tasks are actually executed at the first to fourth processors 122 to 125, or the like.

In operation S440, as a portion of the process of establishing the policy of the machine learning model, the machine learning model manager of the computing device 100 may dynamically assign the blocking mode and the non-blocking mode to the tasks of the machine learning model. Operation S440 may be performed according to the description given with reference to operation S130.

In operation S450, the machine learning model manager of the computing device 100 may execute the machine learning model based on the policy to perform the work. Operation S450 may be performed according to the description given with reference to operation S140.

Figure 9:
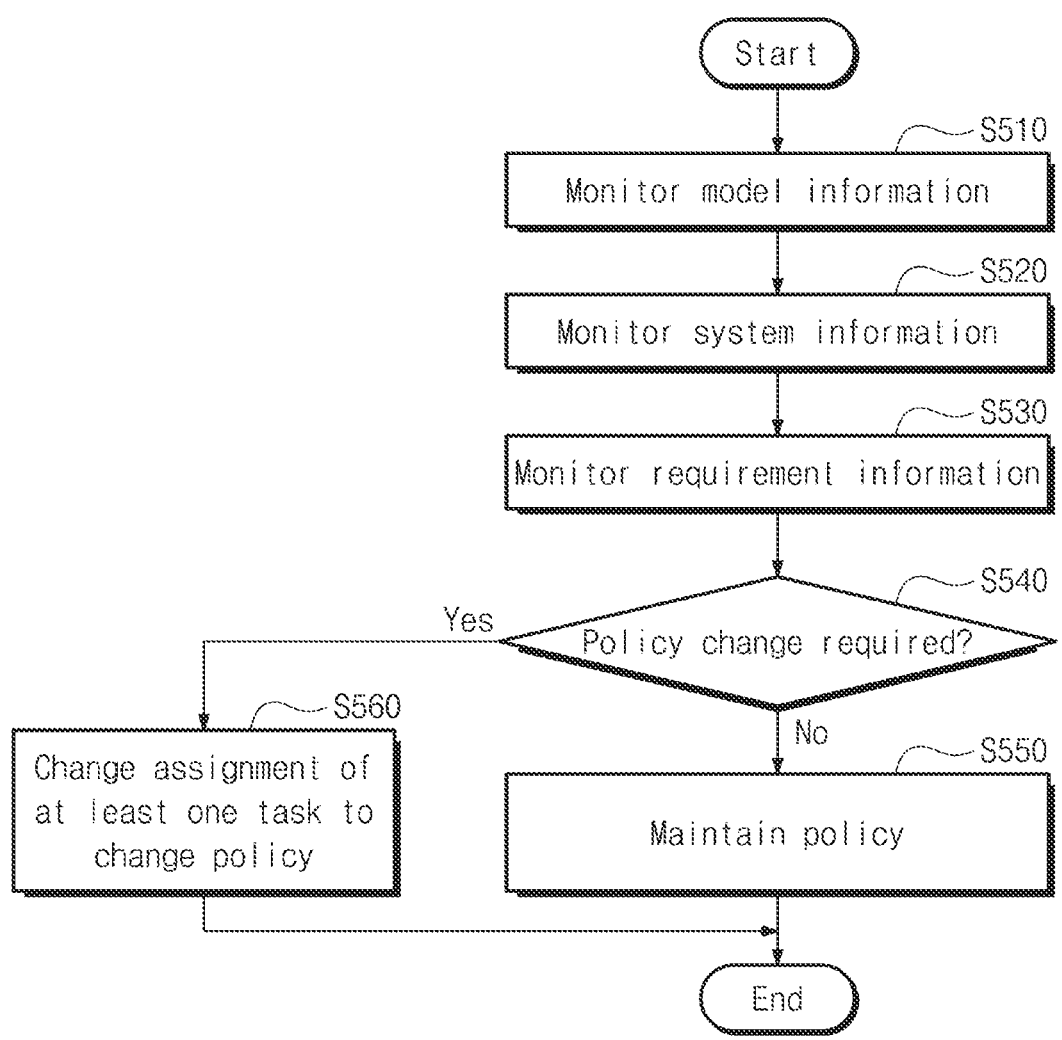
FIG. 9 illustrates an example where a machine learning model manager executed by a processor dynamically changes a policy for performing a work.

FIG. 9 illustrates an example where the machine learning model manager executed by the processor 120 dynamically changes a policy for performing a work. Referring to FIGS. 1 and 9, in operation S510, the machine learning model manager may monitor model information. In operation S520, the machine learning model manager may monitor system information. In operation S530, the machine learning model manager may monitor requirement information.

In operation S540, the machine learning model manager may determine whether a policy change is required. For example, when the model information changes as much as a first threshold value or more, when the system information changes as much as a second threshold value or more, or the requirement information changes, the machine learning model manager may determine that a policy change is required.

In response to that a policy change is not required ("No" branch from operation S540), in operation S550, the machine learning model manager may maintain a policy. In response to that a policy change is required ("Yes" branch from operation S540), in operation S560, the machine learning model manager may change the assignment of at least one task to change the policy.

For example, the policy change may include changing whether to assign each of the tasks to any of the first to fourth processors 122 to 125. The policy change may include changing whether to assign any of the blocking mode and the non-blocking mode to each of the tasks.

For example, the machine learning model manager may be configured to repeatedly perform a work by using the machine learning model and may also be configured to determine whether a policy change is required before performing the work. For another example, the machine learning model manager may be configured to determine whether a change of a policy is required before performing each of tasks of a work or between tasks of a given number of units.

Figure 10:
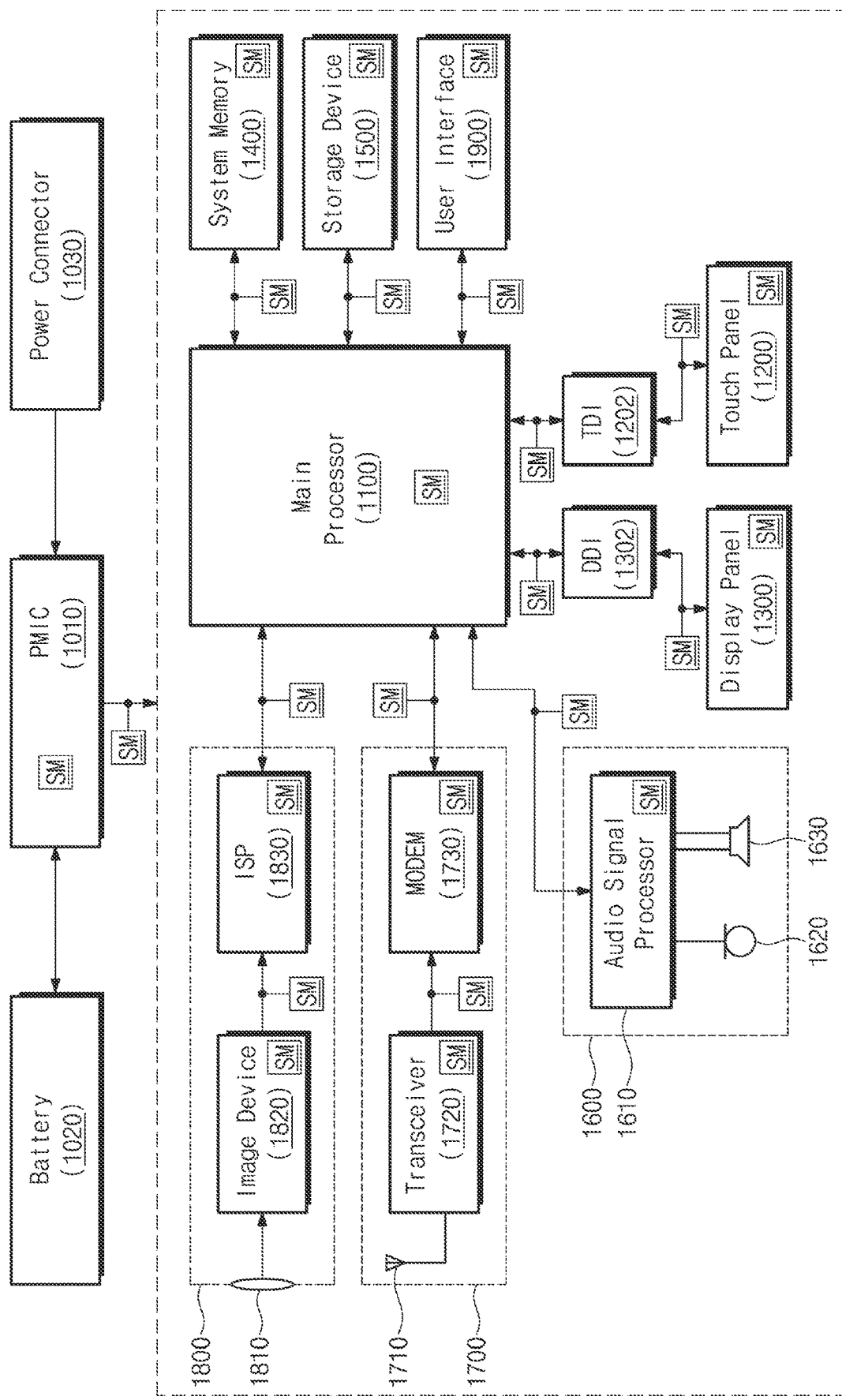
FIG. 10 is a block diagram illustrating an electronic device according to some embodiments of the present disclosure.

FIG. 10 is a block diagram illustrating an electronic device 1000 according to the present disclosure. Referring to FIG. 10, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In some embodiments, the electronic device 1000 may be one of various electronic devices such as an autonomous driving device (or vehicle), a personal computer, a laptop computer, a server, a workstation, a portable communication terminal, a personal digital assistant (PDA), a portable media player (PMP), a digital camera, a smartphone, a tablet computer, and a wearable device, with the understanding that the present disclosure is not limited to these varieties of devices.

The main processor 1100 may control overall operations of the electronic device 1000. The main processor 1100 may control/manage operations of the components of the electronic device 1000. The main processor 1100 may process various operations for the purpose of operating the electronic device 1000.

The main processor 1100 may include the processor 120 described with reference to FIG. 1. For example, as described with reference to FIG. 1, the main processor 1100 may include different heterogeneous sub-processors together with a central processing unit. Alternatively, different heterogeneous sub-processors may be arranged outside the main processor 1100. The sub-processors may respectively perform tasks of a work of a machine learning model under control of the central processing unit.

The touch panel 1200 may be configured to sense a touch input from a user. The touch panel 1200 may be under control of or controlled by the touch driver integrated circuit 1202. The display panel 1300 may be configured to display image information, and may be under control of or controlled by the display driver integrated circuit 1302.

The system memory 1400 may store data that are used in an operation of the electronic device 1000. For example, the system memory 1400 may include a volatile memory, such as a static random access memory (SRAM), a dynamic RAM (DRAM), or a synchronous DRAM (SDRAM), and/or the system memory 1400 may include a nonvolatile memory, such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories, such as a flash memory, a PRAM, an MRAM, a ReRAM, and/or a FRAM. For example, the storage device 1500 may include an embedded memory and/or a removable memory of the electronic device 1000.

The audio processor 1600 may be configured to process an audio signal by using an audio signal processor 1610. The audio processor 1600 may receive an audio input through a microphone 1620, and/or may provide an audio output through a speaker 1630. The communication block 1700 may exchange signals with an external device/system through an antenna 1710. A transceiver 1720 and a modulator/demodulator (MODEM) 2730 of the communication block 1700 may process signals exchanged with the external device/system based on at least one of various wireless communication protocols: for example, long term evolution (LTE), worldwide interoperability for microwave access (WiMax), global system for mobile communication (GSM), code division multiple access (CDMA), Bluetooth, near field communication (NFC), wireless fidelity (Wi-Fi), and/or radio frequency identification (RFID).

The image processor 1800 may be configured to receive a light through a lens 1810. An image device 1820 and an image signal processor (ISP) 1830 included in the image processor 1800 may generate image information about an external object, based on the received light. The user interface 1900 may include an interface capable of exchanging information with a user, and may differ from the touch panel 1200, the display panel 1300, the audio processor 1600, and the image processor 1800. The user interface 1900 may include a keyboard, a mouse, a printer, a projector, various sensors, a human body communication device, or the like. In some embodiments, one or more of the touch panel 1200, the display panel 1300, the audio processor 1600, the image processor 1800, and the user interface 1900 may be omitted.

The electronic device 1000 may further include a power management IC (PMIC) 1010, a battery 1020, and a power connector 1030. The power management IC 1010 may be configured to generate an internal power from a power supplied from the battery 1020 and/or from a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900. In some embodiments, one or more of the above identified components may receive power from a source other than the power management IC 1010.

Each of the components of the electronic device 1000 may include a safety monitor device SM. Safety monitor devices SM may also be connected with each of channels between the components of the electronic device 1000. The electronic device 1000 may be implemented as an in-vehicle autonomous driving system or an infotainment system. The safety monitor device SM may be implemented based on the ISO26262 or ASIL (Automotive Safety Integrity Level) standards.

FIG. 11 illustrates an example of an autonomous driving system 2000. Referring to FIG. 11, the autonomous driving system 2000 may include an autonomous driving vehicle 2100, an external vehicle 2200, and a pedestrian 2300.

The autonomous driving vehicle 2100 may include the computing device 100 described with reference to FIG. 1 and/or the electronic device 1000 described with reference to FIG. 10. The computing device 100 or the electronic device 1000 may execute a machine learning model manager as described with reference to FIGS. 1 to 9. The machine learning model manager may load a machine learning model and may execute the loaded machine learning model.

A work of the machine learning model may be autonomous driving. As tasks of the autonomous driving, the work of the machine learning model may include an object identification task, a task of tracking a movement of the identified object, and an optical flow task, as examples.

FIG. 12 illustrates an example where a policy of a machine learning model is changed at the autonomous driving vehicle 2100 of the autonomous driving system 2000 of FIG. 11. An example where a requirement is changed by a result of a preceding task is illustrated in FIG. 12.

Referring to FIGS. 11 and 12, in operation S610, the machine learning model manager may execute an object identification task in the blocking mode or the non-blocking mode to detect objects. In operation S620, in response to a result of the object identification task, the machine learning model manager may determine whether the closest object is a pedestrian.

When the closest object is a pedestrian ("Yes" branch from operation S620), in operation S630, the machine learning model manager may set a movement tracking task and an optical flow task of the identified object to the non-blocking mode. In other words, in operation S630, a policy may be changes, because the movement tracking task and the optical flow task of the identified object may have been previously set to the blocking mode.

When the closest object is not a pedestrian ("No" branch from operation S620), in operation S640, the machine learning model manager may set the movement tracking task and the optical flow task of the identified object to the blocking mode. For example, the machine learning model manager may first perform the movement tracking task of the identified object and may then perform the optical flow task of the identified object. In other words, in operation S640, a policy may be changed, because the movement tracking task and the optical flow task of the identified object may have been previously set to the non-blocking mode.

As described above, the machine learning model manager of the autonomous driving vehicle 2100 may accelerate an autonomous driving work by setting following tasks to the non-blocking mode depending on whether an object the closest to the autonomous driving vehicle 2100 is a pedestrian. Accordingly, the stability of the autonomous driving vehicle 2100 may be improved.

For example, in the machine learning model performing the autonomous driving work, the machine learning model manager may determine that a faster execution speed is provided by executing a movement tracking task and an optical flow task of an object in the blocking mode, rather than executing the movement tracking task and the optical flow task of the object in the non-blocking mode. In this case, even though a result of a preceding task requires the non-blocking mode, the machine learning model manager may establish a policy of a machine learning model so as to perform a movement tracking task and an optical flow task of an object in the blocking mode.

In the above-described embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

In the above embodiments, components according to embodiments of the present disclosure are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. The blocks may include circuits implemented with semiconductor elements in an integrated circuit and/or circuits enrolled as intellectual property (IP).

According to the present disclosure, tasks of a machine learning model may be dynamically assigned to a blocking mode or a non-blocking mode. Also, the tasks of the machine learning model may be dynamically assigned to processors. Accordingly, operating methods of computing devices executing a machine learning model at improved speed, and computer-readable storage media storing instructions are provided.

While the present disclosure has been described with reference to example embodiments thereof, it will be apparent to those of ordinary skill in the art that various changes and modifications may be made thereto without departing from the scope of the present disclosure as set forth in the following claims.

What is claimed is:

1. An operating method of a computing device which includes a central processing unit and a plurality of sub-processors configured to execute a machine learning model, the method comprising:
dynamically assigning a blocking mode and a non-blocking mode to each of tasks of the machine learning model to establish a policy; and
executing the machine learning model based on the policy,
wherein at least one task of the tasks of the machine learning model transitions between the blocking mode and the non-blocking mode.

2. The method of claim 1, wherein the dynamically assigning of the blocking mode and the non-blocking mode to each of tasks of the machine learning model to establish the policy includes:
assigning the at least one task to one of the blocking mode and the non-blocking mode based on at least one information of the machine learning model, system information of the computing device, and requirement information.

3. The method of claim 2, wherein the information of the machine learning model includes information of a type of the machine learning model, and
wherein the information of the type of the machine learning model is selected from a list of machine learning models including a convolutional neural network (CNN), a recursive neural network (RNN), and a transformer.

4. The method of claim 2, wherein the information of the machine learning model includes information of a work to be executed by the machine learning model, and
wherein the information of the work of the machine learning model is selected from a list of works of the machine learning model including classification, object recognition, and automatic speech recognition (ASR).

5. The method of claim 2, wherein the information of the machine learning model includes a name of the machine learning model or a file name of the machine learning model.

6. The method of claim 2, wherein the information of the machine learning model includes a hierarchical structure of the tasks of the machine learning model.

7. The method of claim 2, wherein the information of the machine learning model includes information of one, which is associated with the tasks of the machine learning model, from among the central processing unit and the plurality of sub-processors.

8. The method of claim 2, wherein the plurality of sub-processors include a neural processing unit (NPU), and
wherein the information of the machine learning model includes information of an NPU control program (NCP) of the neural processing unit.

9. The method of claim 2, wherein the system information of the computing device includes information of input data of the machine learning model.

10. The method of claim 2, wherein the system information of the computing device includes at least one of an available resource and a work load of each of the central processing unit and the plurality of sub-processors.

11. The method of claim 2, wherein the system information of the computing device includes information of a capability and a limitation of each of the central processing unit and the plurality of sub-processors.

12. The method of claim 2, wherein the system information of the computing device includes history information associated with the machine learning model of the computing device.

13. The method of claim 2, wherein the system information of the computing device includes information of an operating mode of the computing device.

14. The method of claim 2, wherein the requirement information includes requirement information of an application program interface (API).

15. The method of claim 2, wherein the requirement information includes a result of at least one different task preceding the at least one task from among the tasks of the machine learning model.

16. The method of claim 1, wherein the dynamically assigning of the blocking mode and the non-blocking mode to each of tasks of the machine learning model to establish the policy includes:
dynamically assigning the central processing unit and the plurality of sub-processors to each of the tasks of the machine learning model.

17. An operating method of a computing device which includes a central processing unit and a plurality of sub-processors configured to execute a machine learning model, the method comprising:
dynamically assigning each of tasks of the machine learning model to one of the central processing unit and the plurality of sub-processors and dynamically assigning a blocking mode and a non-blocking mode to each of the tasks of the machine learning model to establish a policy; and
executing the machine learning model based on the policy,
wherein at least one task of the tasks of the machine learning model transitions between the blocking mode and the non-blocking mode.

18. The method of claim 17, wherein at least one task of the tasks of the machine learning model transitions between the blocking mode and the non-blocking mode, and
at least another of the tasks of the machine learning model is in turn assigned to two different from each other from among the central processing unit and the plurality of sub-processors.

19. A non-transitory computer-readable storage medium storing instructions that, when executed by a central processing unit and a plurality of sub-processors, cause operations comprising:
dynamically assigning each of tasks of a machine learning model to one of the central processing unit and the plurality of sub-processors and dynamically assigning a blocking mode and a non-blocking mode to each of the tasks of the machine learning model to establish a policy; and
executing the machine learning model based on the policy,
wherein at least one task of the tasks of the machine learning model transitions between the blocking mode and the non-blocking mode.

* * * * *